(12) United States Patent
Taglang

(10) Patent No.: US 6,485,032 B2
(45) Date of Patent: Nov. 26, 2002

(54) LEVER-TYPE LATHE CHUCK WITH REPLACEABLE JAW INSERTS

(75) Inventor: Johann Taglang, Medlingen (DE)

(73) Assignee: Rohm GmbH, Sontheim (DE)

( * ) Notice: Subject to any disclaimer, the term of this patent is extended or adjusted under 35 U.S.C. 154(b) by 92 days.

(21) Appl. No.: 09/782,970

(22) Filed: Feb. 14, 2001

(65) Prior Publication Data

US 2001/0015533 A1 Aug. 23, 2001

(30) Foreign Application Priority Data

Feb. 19, 2000 (DE) .................................. 200 03 066 U

(51) Int. Cl.⁷ ............................................... B23B 31/16
(52) U.S. Cl. ...................... 279/123; 279/124; 279/152; 269/282
(58) Field of Search ................. 279/123, 124, 279/152, 153; 269/282

(56) References Cited

U.S. PATENT DOCUMENTS

| | | | |
|---|---|---|---|
| 1,696,765 A | * 12/1928 | Hopkins | |
| 3,868,120 A | * 2/1975 | Blattry | |
| 4,561,663 A | * 12/1985 | Ferraro | |
| 5,040,806 A | * 8/1991 | Hiestand | |
| 5,322,305 A | * 6/1994 | Cross | |
| 5,522,607 A | * 6/1996 | Chen | |
| 5,735,534 A | * 4/1998 | Edwards | |
| 5,842,704 A | * 12/1998 | Gilliam | |

FOREIGN PATENT DOCUMENTS

DE 3512929 * 10/1986 .................. 279/123

* cited by examiner

Primary Examiner—Sebastiano Passaniti
(74) Attorney, Agent, or Firm—Herbert Dubno; Andrew Wilford

(57) ABSTRACT

A chuck has a chuck body adapted to be rotated about a chuck axis and a plurality of elongated jaw arms angularly spaced about the axis, pivotal in the chuck body about respective guide axes extending secantally of the chuck axis, and axially slidable in the body. Each jaw arm has a front outer end formed with a generally axially extending and radially inwardly directed outer face and an axially outwardly and forwardly directed inner face extending radially inward from an axially inner end of the outer face. Each outer face converges axially outward with the chuck axis and forms a small acute angle with the chuck axis. Respective jaw inserts each have a pair of faces complementary to and flatly engaging the respective jaw faces. These inserts are releasably secured to the jaw outer ends with the insert faces bearing on the jaw faces. The faces are planar. In addition each insert is formed with at least one throughgoing hole extending substantially parallel to the outer insert face. A screw fastener in the hole has a head bearing on the insert and a shank threaded into the outer end of the respective jaw arm.

6 Claims, 3 Drawing Sheets

Fig. 2

LEVER-TYPE LATHE CHUCK WITH REPLACEABLE JAW INSERTS

FIELD OF THE INVENTION

The present invention relates to a chuck. More particularly this invention concerns a lever-action lathe chuck with replaceable jaw inserts.

BACKGROUND OF THE INVENTION

A standard lever-action chuck for use in a lathe or the like has a body adapted to be rotated about a chuck axis. A plurality of angularly equispaced guides are pivotal in the body about respective guide axes extending secantally of the axis, that is about axes that are offset from the chuck axis and that each lie in a plane generally perpendicular to the chuck axis. Respective elongated jaw arms axially slidable in the guides each have an outer end to which is fixed a jaw insert intended to directly engage a workpiece being gripped by the chuck. Means is provided to axially displace the jaw arms between outer positions with their outer ends spaced forward from an end face of the chuck body and inner positions with their outer ends close to or even recessed in the end face of the chuck body. Further means is provided for pivoting the jaw arms about the respective secantal guide axes so that, in the outer position, the outer arm ends can pivot in to grip a workpiece.

Such chucks are typically used in axially confronting pairs to rotate a workpiece such as a crank shaft that is gripped at both ends and rotated about the coaxial chuck axes to machine bearing and crank surfaces of the crankshaft. The retractability of the jaw arms makes it possible to load the workpiece into the chucks and remove it from them radially of the machining axis without having to axially displace the chucks. The pivotability of the jaw arms makes it possible to clasp them on the workpiece without applying an axial force to the workpiece, which force could distort it.

Such a chuck is clamped very solidly to the workpiece and it is fairly common for the jaw inserts to shift slightly relative to the arms, no matter how solidly these steel parts are bolted together. This axial shifting of these inserts can put an axial stress on the workpiece, potentially deforming it.

OBJECTS OF THE INVENTION

It is therefore an object of the present invention to provide an improved lever-type chuck with removable jaw inserts.

Another object is the provision of such an improved lever-type chuck with removable jaw inserts which overcomes the above-given disadvantages, that is whose jaw inserts will remain in position no matter how hard the chuck is clamped on a work piece.

SUMMARY OF THE INVENTION

A chuck has according to the invention a chuck body adapted to be rotated about a chuck axis and a plurality of elongated jaw arms angularly spaced about the axis, pivotal in the chuck body about respective guide axes extending secantally of the chuck axis, and axially slidable in the body. Each jaw arm has a front outer end formed with a generally axially extending and radially inwardly directed outer face and an axially outwardly and forwardly directed inner face extending radially inward from an axially inner end of the outer face. Each outer face converges axially outward with the chuck axis and forms a small acute angle with the chuck axis. Respective jaw inserts each have a pair of faces complementary to and flatly engaging the respective jaw faces. These inserts are releasably secured to the jaw outer ends with the insert faces bearing on the jaw faces.

Thus with this system the jaw inserts are extremely solidly mounted on the respective arms. The radially outwardly directed forces exerted on the jaw inserts when they are pressed radially inward against a workpiece will merely serve to press them into better contact with the jaw faces they already engage, so that they will not shift at all. Nothing short of compression or deformation of the steel arm or jaw insert, which is impossible under normal conditions, can move the jaw insert on its arm.

The faces according to the invention are planar. In addition each insert is formed with at least one throughgoing hole extending substantially parallel to the outer insert face. A screw fastener in the hole has a head bearing on the insert and a shank threaded into the outer end of the respective jaw arm.

Each jaw has an inner gripping face extending generally parallel to the chuck axis. In addition each inner face extends at substantially 90° to the respective outer face. Each jaw has a flat front face diverging radially inward away from the respective inner face.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
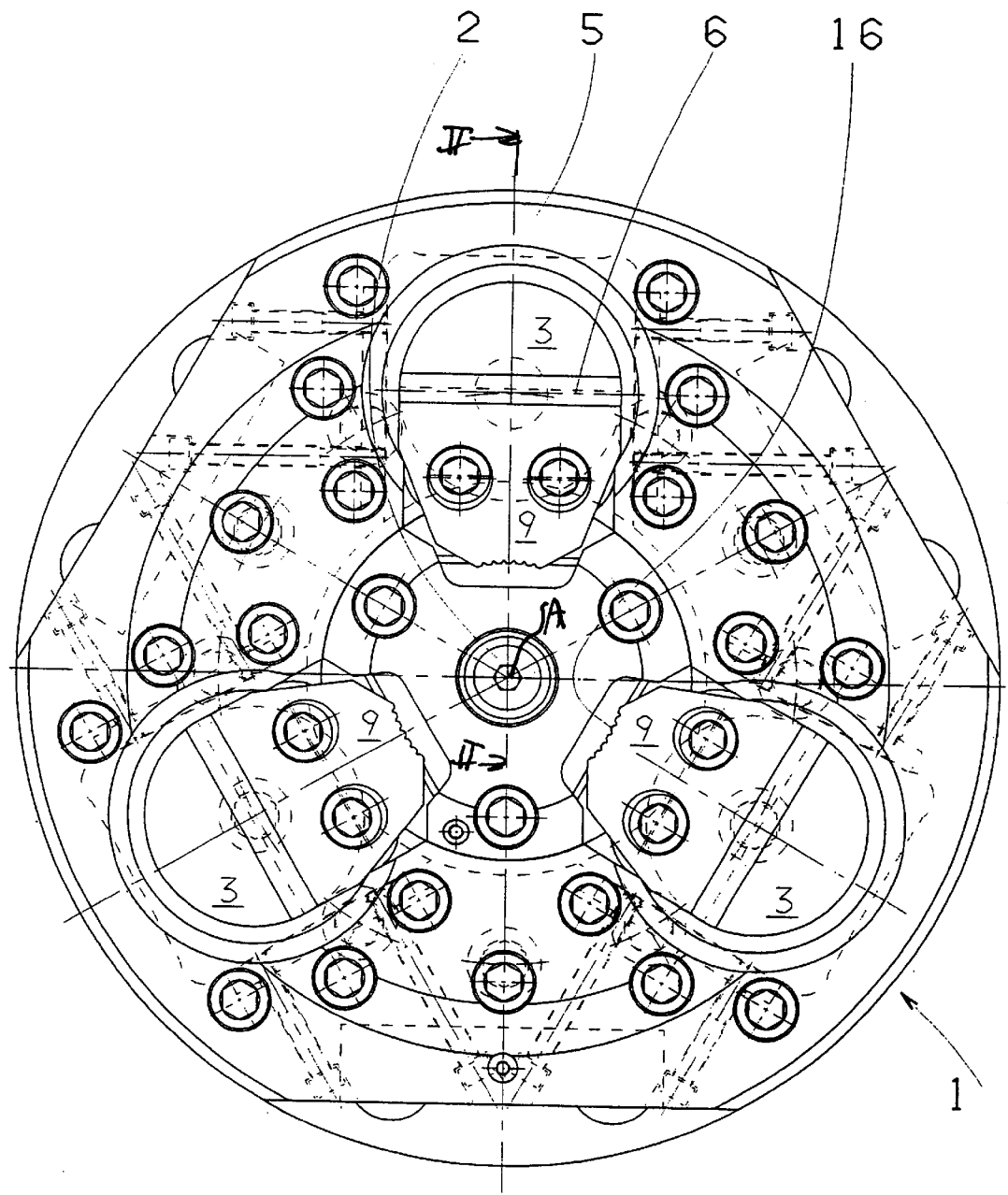
FIG. 1 is an end view of the chuck according to the invention.
Figure 2:
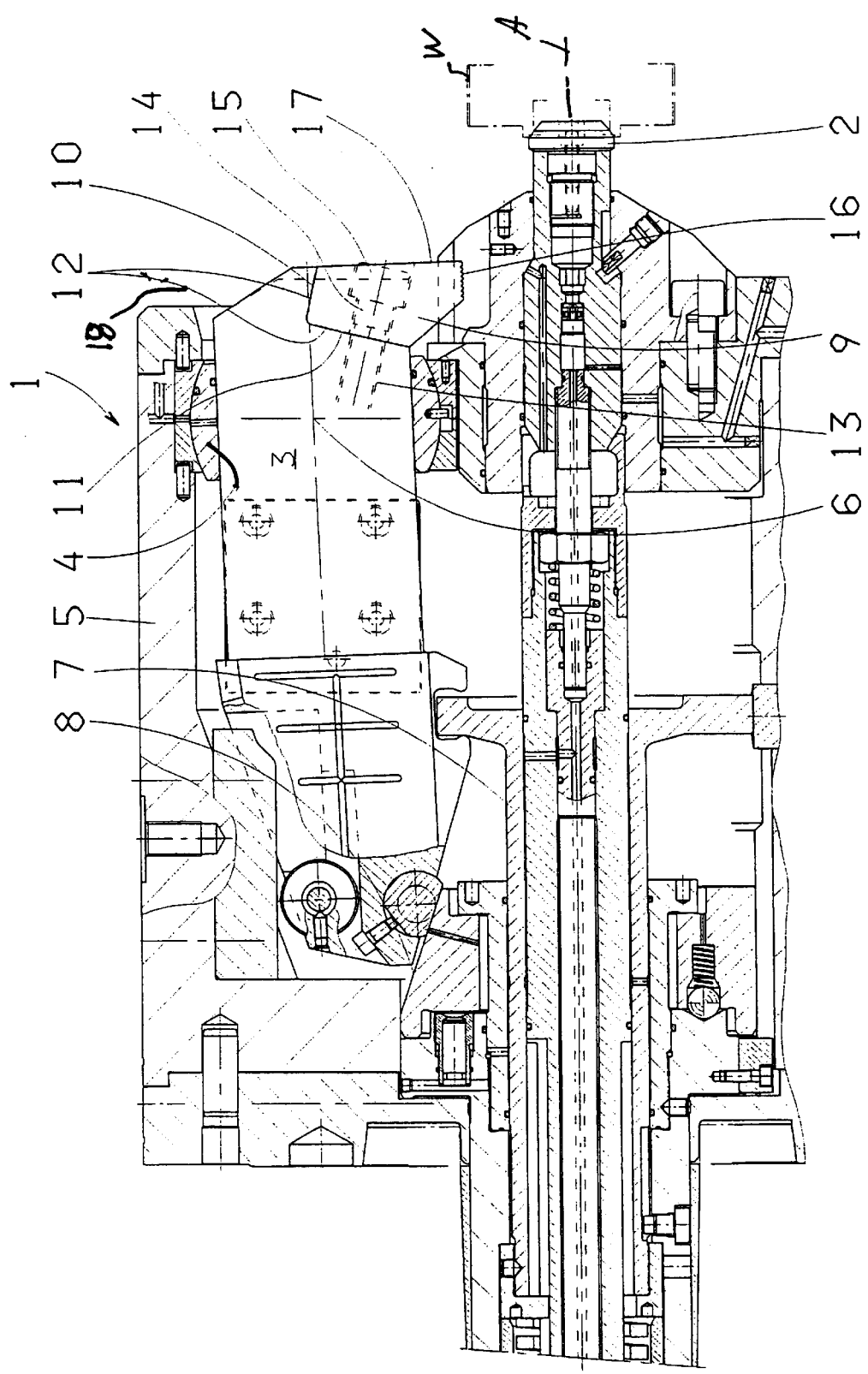
FIG. 2 is a section taken along line II—II of FIG. 1.

As seen in FIGS. 1 and 2 a chuck 1 according to the invention has a multipart steel body 5 centered on a normally horizontal axis A and carrying three angularly equispaced and axially extending arms 3. The front or outer end of each arm 3 is fitted with a jaw insert 7 held in place by a pair of screws 14 and having a gripping face 16 adapted to engage a workpiece W held on a centering pin 2. The jaw arms 3 slide axially in ball guides 4 under the control of an axially displaceable actuating element 7 between an unillustrated extended or outer position and the retracted position of FIG. 2. The jaw arms 3 are also pivotal in their respective guides 4 about respective secantal axes 5 by a wedge collar 8 coaxial with the actuating element 9. This is all generally standard.

According to the invention each jaw arm 3 has a seat formed by a planar and generally axially extending and radially inwardly directed outer face 10 and with a planar radially extending and axially forwardly directed inner face 11 forming a 90° angle with the outer face 10. The outer face 10 is inclined axially forward inward, forming an acute angle of about 18° with the axis A so as to converge axially forward with the axis A.

Figure 5:
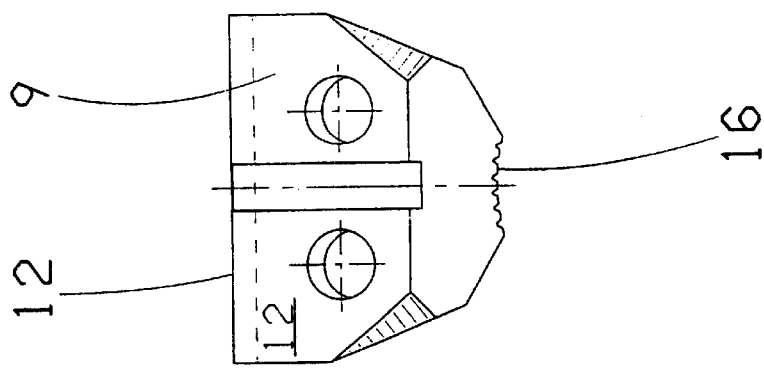
FIG. 5 is a view taken in the direction of arrow V of FIG. 4.
Figure 4:
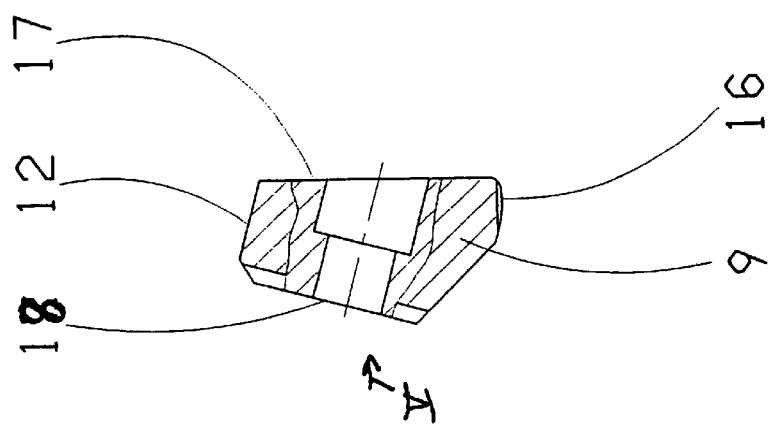
FIG. 4 is a section taken along line IV—IV of FIG. 3.
Figure 3:
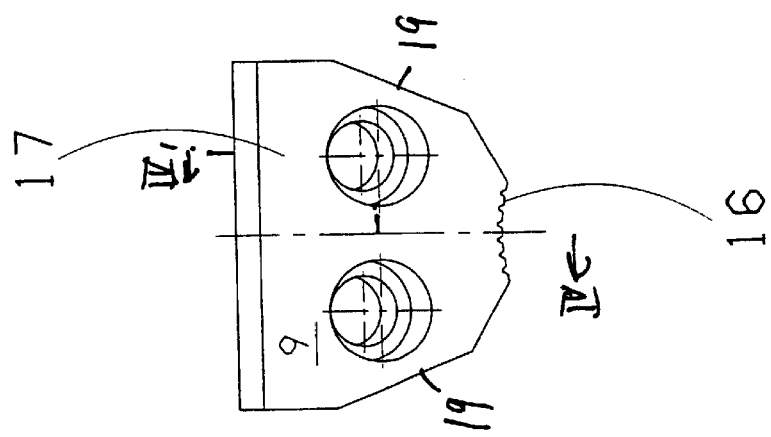
FIG. 3 is an end view of a chuck insert according to the invention.

As also shown in FIGS. 3 through 5, the jaw insert 9 has planar faces 12 and 18 that fit complementarily with the outer and inner seat faces 10 and 11 and a front face 17 forming, when installed, a radially inwardly open acute angle with the back face 18. Thus the jaw insert 9 is as shown in FIG. 4 of radially inwardly increasing axial dimension, effectively wedge shaped. Each jaw insert 9 is formed with a pair of countersunk throughgoing bores 13 extending parallel to the axial outer faces 12 and receiving the screws 14. Furthermore the jaw inserts 9 each have angularly directed side faces 19 that are radially outwardly flared, giving the jaw insert 9 an inwardly tapering shape as shown in FIGS. 3 and 5.

Thus, when the jaw arm 3 of a jaw insert 9 is pivoted about its axis 6 to press the gripping face 16 of the insert 9 against the workpiece W, the insert 9 will not be able to shift at all on the jaw arm 3. Instead it will remain solidly engaged in the seat formed by the faces 10 and 11 and the radially outwardly effective force created when clamping a workpiece W will merely increase the force with which the faces 12 and 18 bear on the respective faces 10 and 11.

I claim:

1. A chuck comprising:

a chuck body adapted to be rotated about a chuck axis;

a plurality of elongated jaw arms angularly spaced about the axis, pivotal in the chuck body about respective guide axes extending secantally of the chuck axis, and axially slidable in the body, each jaw arm having a front outer end formed with a generally axially extending and radially inwardly directed outer face and an axially outwardly and forwardly directed inner face extending radially inward from an axially inner end of the outer face, the outer faces each converging axially outward with the chuck axis and forming a small acute angle with the chuck axis;

respective jaw inserts each having a pair of faces complementary to and flatly engaging the respective jaw faces; and means for releasably securing the inserts to the jaw outer ends with the insert faces bearing on the jaw faces.

2. The chuck defined in claim 1 wherein the faces are planar.

3. The chuck defined in claim 1 wherein each insert is formed with at least one throughgoing hole extending substantially parallel to the insert face, the means being a screw fastener in the hole and having a head bearing on the insert and a shank threaded into the outer end of the respective jaw arm.

4. The chuck defined in claim 1 wherein each jaw has an inner gripping face extending generally parallel to the chuck axis.

5. The chuck defined in claim 1 wherein each inner face extends at substantially 90° to the respective outer face.

6. The chuck defined in claim 1 wherein each jaw has a flat front face diverging radially inward away from the respective inner face.

* * * * *